United States Patent Office 3,547,913
Patented Dec. 15, 1970

---

3,547,913
16β-METHYL-16α,17α-EPOXY PREGNENOLONE AND THE 3-ACYLATES THEREOF
Meyer Sletzinger and Donald Reinhold, North Plainfield, N.J., assignors to Merck & Co., Inc., Rahway, N.J., a corporation of New Jersey
No Drawing. Filed Oct. 1, 1958, Ser. No. 764,524
Int. Cl. C07c *173/00, 173/10*
U.S. Cl. 260—239.55
8 Claims

ABSTRACT OF THE DISCLOSURE

The instant invention relates to 3β-hyhroxy-16α,17α-oxido-16β-methyl-5-pregnen-20-ones, intermediates in the synthesis of 16β-methyl-17α,21-dihydroxy-4-pregnene-3,20-dione.

---

This invention relates to novel steroid compounds and more particularly to 16β-methyl-17α,21-dihydroxy-4-pregnene - 3,20-dione, 16β-methyl-17α,21-dihydroxy-1,4-pregnadiene-3,20-dione and the 21-acylates thereof.

It has now been found that 16β-methyl-17α,21-dihydroxy-4-pregnene-3,20-dione, the corresponding 1-dehydro compound and the 21-esters thereof can be synthesized by reactions indicated as follows:

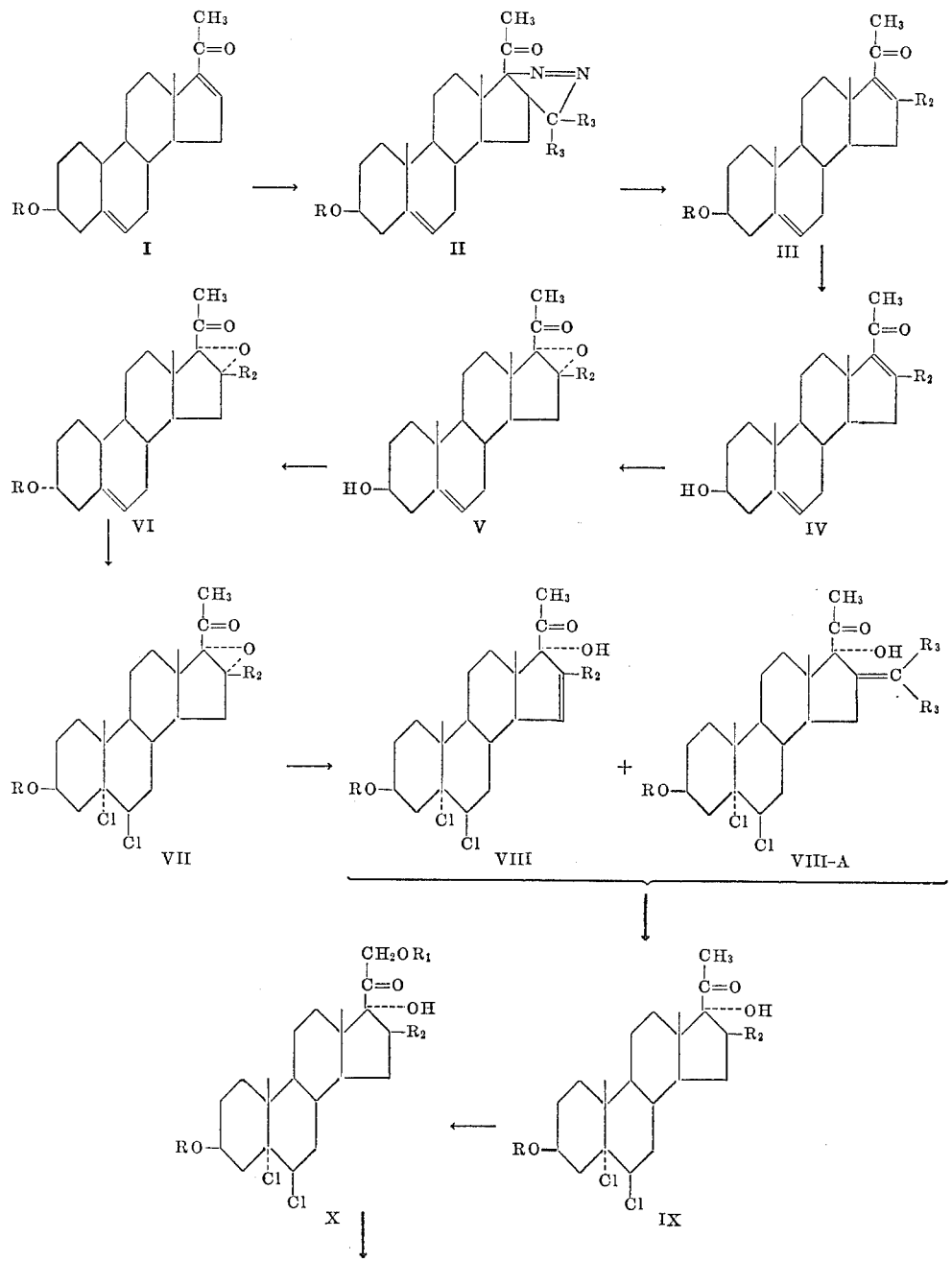

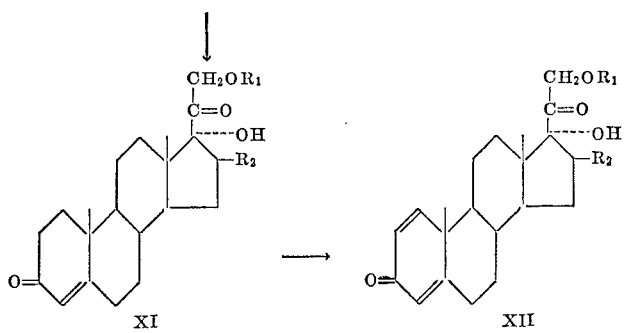

In the above structural formulae R is an acyl substituent, $R_1$ is hydrogen or acyl, $R_2$ is an alkyl substituent and $R_3$ is hydrogen or alkyl.

The reactions indicated are conducted as follows: A 3-oxygenated-5,16-pergnadien-20-one compound (Compound I) is contacted in solution with a source of a diazoalkane to produce a 3-oxygenated-16α,17α-alkyleneazo-5-pregnen-20-one comopnd (Compound II). This latter compound is heated to form a 3-oxygenated-16-alkyl-5,16-pregnadien-20-one compound (Compound III or IV) which is oxidized with a peroxy acid to form a 3-oxygenated-16, 17-oxido - 16 - alkyl-5-pregnen-20-one compound (Compound V). The latter compound, preferably in the form of the 3-acylate is contacted in solution with chlorine to produce the 5,6-dichloro-3-oxygenated-16,17-oxido-16β-alkyl-allopregnan-20-one compound (Compound VII). This latter compound is then hydrolyzed under acidic conditions to produce a mixture comprising 5,6-dichloro-3-oxygenated-17α-hydroxy-16-alkyl-15(16)-allopregnen-20-one and 5,6-dichloro-3-oxygenated-17α-hydroxy-16-alkylene allopregnan-20-one (Compounds VIII and VIII-A). The latter mixture is then hydrogenated to produce as the main product 5,6-dichloro-3-oxygenated-17α-hydroxy-16β-alkyl allopregnan-20-one. The latter compound is then contacted with a halogen to form the corresponding 21-halo compound which is treated with an alkali metal acylate to produce 5,6-dichloro-3-oxygenated-17α-hydroxy - 21-acyloxy-16β-methyl allopregnan-20-one. The latter compound is then contacted with a dechlorinating agent to produce a 3,17α-dihydroxy-21-acyloxy-16β-methyl-4-pregnen-20-one compound (Compound X). The latter compound is then oxidized to produce 17α-hydroxy-21-acyl-oxy-16β-alkyl-4-pregnene - 3,20 - dione (Compound XI) which is dehydrogenated using selenium dioxide or microbial fermentation procedures to form a 17α-hydroxy-21-acyloxy-16β-alkyl-1,4-pregnadiene-3,20-dione compound (Compound XII).

The 3-oxygenated-16α,17α-alkyleneazo-5-pregnen - 20-one is prepared by contacting a solution of a 3-oxygenated-5,16-pregnadien-20-one compound with a diazoalkane. When the 3-oxygenated compound employed is a 3-hydroxy-5,6-pregnadien-20-one, a 3-acetoxy-5,16-pregnadien-20-one or a 3-benzoyloxy-5,6-pregnadien-20-one and the diazoalkane employed is diazomethane, the resulting compounds which are formed are, respectively, 3-hydroxy - 16,17-methyleneazo-5-pregnen-20-one, 3-acetoxy-16α,17α-methyleneazo-5-pregnen-20-one and 3-benzoyl-oxy-16α,17α-methyleneazo-5-pregnen - 20 - one. The reagents may be added to the reaction mixture in either order of addition and the diazoalkane, e.g., diazomethane may be formed separately or may be formed in situ. In a preferred method of operation a solution of 3-acetoxy-5,16-pregnadien-20-one is prepared and diazomethane is formed directly in the reaction mixture. When other diazoalkanes are employed such as diazoethane, the steroid product formed is the corresponding 16α,17α-alkyleneazo pregnene, e.g., 16α,17α-ethyleneazo pregnene. Suitable solvents for the reaction are those which are normally unreactive with either of the reagents. Ordinarily a mildly alkaline organic solvent such as an N,N-dialkylacyamide, e.g., N,N-dimethyformamide is preferred.

Upon heating 3-oxygenated - 16α,17α - alkyleneazo-5-pregnen-20-one compounds, there are obtained as the main products 3-oxygenated - 16 - alkyl-5,16-pregnadien-20-one compounds. Thus, when 3-acetoxy-16α,17α-methyleneazo-5-pregnen-20-one, 3-benoyloxy - 16α,17α - methyl-eneazo-5-pregnen-20-one, 3 - benzoyloxy-16α,17α-methyl-eneazo-5-pregnen-20-one are heated for a brief period there are obtained, respectively, 3-acetoxy-16-methyl-5, 16-pregnadien-20-one, 3-benzoyloxy - 16 - methyl-5,16-pregnadien-20-one and 3-hydroxy-16-methyl-5,16-pregna-dien-20-one. In a preferred embodiment of this heating procedure the 3-acetoxy compound is employed and the 3-acetoxy - 16 - methyl-5,16-pregnadien-20-one which results may be converted to the corresponding 3-hydroxy compounds by hydrolysis with potassium hydroxide in aqueous methanol. Oxidation of 3-oxygenated-16-alkyl-16-pregnen-20-one compounds such as 3-hydroxy-16-alkyl-16-pregnen-20-one compounds or esters thereof, e.g., 3-acetates, 3-propionates or the 3-benzoates with an oxidizing agent such as hydrogen peroxide in an alkaline medium or peracids such as peroxy trifluoro acetic acid results in the formation of 16β-alkyl-3-oxygenated-16α, 17α-oxido-5-pregnen-20-one compounds such as 3-hydroxy - 16α,17α - oxido-16β-methyl-5-pregnen-20-one, 3-acetoxy - 16α,17α - oxido-16β-methyl-5-pregnen-20-one, 3-propionyloxy - 16α,17α - oxido-16β-methyl-5-pregnen-20-one and 3-benzoyloxy - 16,17 - oxido-16β-methyl-5-pregnen-20-one. It is preferred to employ the 3-hydroxy derivative in this step following which the corresponding 3-ester may be prepared by treatment of the 3-hydroxy compound with an appropriate carboxylic acid anhydride in pyridine, e.g., acetic anhydride in pyridine.

Prior to the following reaction steps, it is desired to protect the 5,6-double bond; this is conveniently accomplished by the addition of chlorine to form the 5,6-dichloro derivatives. In this chlorination procedure it is more desirable to use the 3-acyloxy derivative instead of the 3-hydroxy derivative in view of the known oxidizing ability of chlorine. Thus, a solution of a 3-acyloxy-16β-alkyl-16α,17α-oxido-5-pregnen-20-one and a dry organic solvent, preferably in the presence of a small amount of base such as pyridine is contacted with chlorine gas to form the corresponding 5,6-dichloro-3-oxygenated-16β-alkyl - 16α,17α - oxido allopregnan-20-one. Typical examples of compounds formed by this chlorination procedure are 5,6-dichloro-3-acetoxy-16α,17α-oxido-16β-methyl allopregnan-20-one, 5,6 - dichloro-3-benzoyl-oxy-16α,17α-oxido-16β-methyl allopregnan-20-one and 5, 6 - dichloro-3-acetoxy-16α,17α-oxido-16β-ethyl allopreg-nan-20-one.

The 5,6-dichloro - 3 - oxygenated-16β-alkyl-16α,17α-oxido allopregnan-20-one is then treated with a strong acid such as perchloric acid to form a mixture of products having a double bond attached to the 16-position of the molecule, i.e., 5,6-dichloro-3,17α-dihydroxy-16β-alkyl-15(16)-allopregnen-20-one and 5,6-dichloro-3,17α-dihydroxy-16-methylene allopregnan-20-one. These compounds are conveniently converted, if desired, to the corresponding esters by reaction with an appropriate carboxylic acid anhydride in pyridine to form, for example, 5,6-dichloro - 3 - acetoxy-17α-hydroxy-16β-methyl-15-

(16)-allopregnen-20-one and 5,6-dichloro-3-acetoxy-17α-hydroxy-16-methylene allopregnan-20-one.

Hydrogenation of the mixture of 5,6-dichloro-3-oxygenated-17α-hydroxy - 16β - alkyl-15(16)-allopregnan-20-one and 5,6-dichloro-3-oxygenated - 17α - hydroxy-16-alkylene allopregnan-20-one with hydrogen in the presence of a hydrogenation catalyst such as platinum oxide results in the formation of 5,6-dichloro-3-oxygenated-17α-hydroxy-16β-alkyl allopregnan-20-one as the main reaction product. In a preferred method of operation, the selected hydrogenation steroid substrate material is a mixture of 5,6-dichloro-3,17α-dihydroxy - 16β - methyl-15(16)-allopregnen-20-one and 5,6-dichloro - 3,17α - dihydroxy-16-methylene allopregnan-20-one. When this mixture is employed in the hydrogenation procedure there is obtained as the main reaction product 5,6-dichloro-3,17α-dihydroxy-16β-methyl allopregnan-20-one which may be conveniently converted by reaction with a carboxylic acid anhydride in pyridine, e.g. acetic anhydride in pyridine to the corresponding 3-acylate thereof, e.g., 5,6-dichloro-3-acetoxy-17α-hydroxy-16β-methyl allopregnan-20-one. The latter product is then treated in order to introduce an oxygen function at the 21-position. This is accomplished by halogenation of 5,6-dichloro-3-oxygenated-17α-hydroxy - 16β - alkyl allopregnan-20-one to form the corresponding 21-halo compound, i.e., 5,6-dichloro-3-oxygenated - 17α - hydroxy-16β-alkyl-21-halo allopregnan-20-one followed by treatment of the 21-halo compound with an alkali metal salt of carboxylic acid to form the corresponding 21-acylate. In a preferred embodiment the 5,6-dichloro-3,17α-dihydroxy - 16β - methyl compound is first brominated to form the 21-bromo derivative. The 21-bromo compounds are preferably first dissolved in a suitable organic solvent for the compound as, for example, a lower ketone solvent, i.e., acetone. The reaction preferably takes place upon heating or refluxing the bromo compound with the alkali metal carboxylic acid salt. Typical alkali metal carboxylic acid salts for the reaction are potassium or sodium acetate, potassium or sodium propionate, and so forth. In the preferred method of reaction the 21-bromo compounds are reacted in the presence of a mixture of an alkali metal iodide and an alkali metal acylate, whereby replacement of the 21-bromo substituent by 21-iodo substituent occurs to form the corresponding 5,6-dichloro-3-oxygenated-17α-hydroxy-16β-alkyl-21-iodo allopregnan-20-one followed by replacement of the 21-iodo substituent with an acyloxy substituent to form a 5,6-dichloro-3-oxygenated-17α-hydroxy - 21 - acetoxy-16β-alkyl allopregnan-20-one compound. Typical examples of compounds which may be formed by this halogenation and acetoxylation reaction are 5,6 - dichloro - 3,17α - dihydroxy-21-acetoxy-16β-methyl allopregnan-20-one, 5,6-dichloro - 3,21 - diacetoxy-17α-hydroxy-16β-methyl allopregnan-20-one and 5,6-dichloro - 3,17α - dihydroxy-21-acetoxy-16β-ethyl allopregnan-20-one.

The 5,6-dichloro-3-oxygenated-17α-hydroxy-21-acyloxy-16β-alkyl allopregnan-20-one compounds thus obtained are then treated to regenerate the double bond and convert the 3-hydroxy substituent to a keto substituent. This may be accomplished by treatment of the latter compound with an oxidizing agent and a dechlorinating agent in either order, although it is preferred to first carry out the oxidation step before the dechlorination step. Thus, reaction of 5,6 - dichloro - 3 - oxygenated - 17α-hydroxy-21-acyloxy allopregnan-20-one as, for example, 5,6-dichloro-3,17α - dihydroxy-21-acetoxy-16β-methyl allopregnan-20-one with a solution of chromium trioxide in acetic acid produces the corresponding 5,6-dichloro-17α-hydroxy-21-acetoxy-16β-methyl allopregnane-3,20-dione. The resulting 5,6-dichloro-3,20-diketo compound is then dechlorinated using any of the known dechlorinating agents as, for example, zinc or chromous chloride, chromous chloride being preferred, to form a 17α-hydroxy-21-acyloxy-16β-alkyl-4-pregnene-3,20-dione compound such as 17α-hydroxy-21-acetoxy-16β-methyl-4-pregnene-3,20-dione, 17α-hydroxy - 21 - propionyloxy-16β-methyl-4-pregnene-3,20-dione. The 4-pregnene-3,20-dione compounds thus formed may then be dehydrogenated chemically or microbiologically to form the corresponding 1,4-pregnadiene-3,20-dione compounds.

In carrying out the microbiological dehydrogenation procedure the 16β-methyl-17α,21-dihydroxy-4-pregnene-3,20-dione or the corresponding 21-acylate is contacted with the dehydrogenating activity of microorganisms of the species *Bacillus sphaericus*. The species *Bacillus sphaericus* as defined in Bergey's Manual for Determinative Bacteriology, sixth edition, comprises several varieties such as the *rotans* variety, the *fusiformous* variety, etc. and in some collections, these varieties are referred to by the species names *Bacillus rotans* and *Bacillus fusiformous*. These microorganisms can be obtained from known sources such as the American Type Culture Collection, Washington, D.C. or they may also be isolated from natural sources such as soil by known methods.

It is desired to emphasize that the preferred dehydrogenating strains can be selected by the following test method: A nutrient medium containing 1 g. of cerelose, 1 g. of edamin, 0.25 ml. of cornsteep liquor, 0.05 g. of yeast extract, and suffcient distilled water to make 50 ml., is adjusted to pH 6.5, sterilized and inoculated with a culture of the *Bacillus sphaericus* strain to be tested for its Δ¹-dehydrogenating activity. The resulting culture is incubated for a period of 24 hours at a temperature of 28° C., and a sample of the culture is transferred to a second 50 milliliter sample of the aforementioned nutrient medium which has likewise been adjusted to pH 6.5 and sterilized. The resulting inoculated culture is then incubated at a temperature of 28° C., with agitation, for a 24-hour period, and to the resulting culture is added a solution containing 10 mg. of 16β-methyl-17α,21-dihydroxy-4-pregnene-3,20-dione dissolved in 0.1 ml. of dimethylformamide. The culture containing the steroid compound is incubated, with agitation, for an additional period of about 10 hours at 28° C. The fermentation broth is repeatedly extracted with ethyl acetate, and the ethyl acetate extracts are combined and evaporated to dryness in vacuo to yield a residue comprising 16β-methyl-17β,21 - dihydroxy-1,4-pregnadiene-3,20-dione. A portion of the residual material is dissolved in acetone and spotted on a paper chromatogram which is developed using formamide as the stationary phase and chloroform as the mobile phase. Two separate bands are ordinarily obtained, the lower band corresponding to unchanged steroid; the upper band corresponds to the Δ¹-dehydro derivative. Both bands are cut off, separately eluted with methanol, and each of the methanol eluants are subjected to ultraviolet absorption analysis. The efficiency of the microorganism strain being tested in effecting Δ¹-dehydrogenation is indicated by the relative proportions of Δ¹-dehydro derivative and unchanged hydrocortisone as measured by this ultraviolet absorption analysis.

Irrespective of whether the steroid starting material is a 16β - methyl-17α,21-dihydroxy-4-pregnene-3,20-dione or the corresponding 21-ester thereof, the product obtained is the corresponding 16β-methyl-17α,21-dihydroxy-1,4-pregnadiene-3,20-dione, since any 21-ester group which may be present is hydrolyzed during the microbiological dehydrogenation reaction. These 16β-methyl-17α,21-dihydroxy-1,4-pregnadiene-3,20-dione compounds can be converted to the corresponding 21-esters by reaction with an acylating agent, e.g., a lower hydrocarbon carboxylic acid acylating agent such as benzoic anhydride, propionic anhydride, acetic anhydride, succinic anhydride, and the like. The above-described method is also exemplary of the preferred method of carrying out our microbiological dehydrogenation procedure.

In accordance with this acylation procedure, there are obtained 16β-methyl-17α-hydroxy-21-acyloxy-1,4-pregnadiene-3,20-dione compounds as, for example, 16β-methyl- 17α-hydroxy-21-benzoyloxy-1,4-pregnadiene-3,20-dione, 16β-methyl-17α-hydroxy-21-acetoxy-1,4-pregnadiene-3,20-dione, 16β-methyl-17α-hydroxy-21-propionyloxy-1,4-pregnadiene-3,20-dione and 16β-methyl-17α-hydroxy-21-succinyloxy-1,4-pregnadiene-3,20-dione.

Alternatively, instead of the above-described microbiological dehydrogenation method, the 16β-methyl-17α,21-dihydroxy-4-pregnene-3,20-dione compound preferably in the form of the 21-acylate thereof, is reacted with selenium dioxide, thereby effecting Ring-A dehydrogenation to form the corresponding 16β-methyl-17α-hydroxy-21-acetoxy-1,4-pregnadiene-3,20-dione compound. This selenium dioxide dehydrogenation procedure is conveniently conducted by bringing the 16β-methyl-17α-hydroxy-21-acyloxy-4-pregnene-3,20-dione compound and selenium dioxide together in the presence of an organic solvent such as, for example, an alcohol solvent such as t-butanol, etc., and heating the mixture at an elevated temperature. When t-butanol is used as the solvent, it is ordinarily preferred to carry out this reaction at the boiling point of the solvent under which conditions the reaction is ordinarily complete in about 15 hours. The reaction mixture is then filtered, thereby removing metallic selenium and the filtered solution evaporated to dryness in vacuo to give the desired 16β-methyl-17α-hydroxy-21-acyloxy-1,4-pregnadiene-3,20-dione compound such as 16β-methyl-17α-hydroxy-21-acetoxy-1,4-pregnadiene-3,20-dione, 16β-methyl-17α-hydroxy-21-propionyloxy-1,4-pregnadiene-3,20-dione and 16β-methyl-17α-hydroxy-21-benzoyloxy-1,4-pregnadiene-3,20-dione. The crude material obtained in this way is conveniently purified by chromatography in accordance with procedures known to chemists skilled in the steroid art.

The 16β-methyl compounds in this invention, the 17α,21-dihydroxy-4-pregnene-3,20-dione compounds, the 17α,21-dihydroxy-1,4-pregnadiene-3,20-dione compounds and the 21-esters thereof are useful as intermediates in the preparation of highly active, anti-inflammatory steroids such as 11β,17α,21-trihydroxy-16β-methyl-4-pregnene-3,20-dione and 11β,17α,21-trihydroxy-16β-methyl-1,4-pregnadiene-3,20-dione. Thus, the compounds of this invention may be hydroxylated at the 11-position using microbiological fermentation techniques. Thus, for example, treatment of 17α,21-dihydroxy-16β-methyl-4-pregnene-3,20-dione or 17α,21-dihydroxy-16β-methyl-1,4-pregnadiene-3,20-dione with a growing culture of a selected strain of the species *Curvularia lunata* results in the introduction of a hydroxyl group in the 11-position of the steroid to produce the highly active compounds 11β,17α,21-trihydroxy-16β-methyl-4-pregnene-3,20-dione and 11β,17α,21-trihydroxy-16β-methyl-1,4-pregnadiene-3,20-dione.

The following examples illustrate the methods of carrying out the present invention, but it is to be understood that these examples are given for illustration and not by way of limitation.

EXAMPLE 1

3-acetoxy-16α-17α-methyleneazo-5-pregnen-20-one

A solution of 16-dehydro pregnenolone acetate (9.62 g.) and N,N¹-dimethyl-N,N¹-dinitroso-terephthalamide (14.2 g.) in dimethylformamide (300 ml.) is cooled to 5° in an ice bath. To the steroid solution is added dropwise a solution of 50% aqueous methyl amine (50 ml.) in dimethylformamide (50 ml.) over a period of thirty minutes at 5–10°. The mixture is stirred for an additional 2.5 hours at 5–10°. The excess diazomethane is destroyed with 1.2% acetic acid solution (350 ml.). The precipitate is filtered and washed thoroughly with water. The pyrazoline product is extracted from the cake with methylene chloride (150 ml.). The methylene chloride is washed with water, dried and concentrated to a volume of 50 ml. N-hexane B (100 ml.) is then added and the solvent distilled on the steam bath until crystallization of the product commenced. The mixture is then cooled in an ice bath and filtered. The pyrazoline product is washed with petroleum ether and dried (M.P. 163–165° C. dec.). Recrystallization from methanol raises the melting point to 168–169° C. dec.

EXAMPLE 2

3-acetoxy-16β-methyl-5,16-pregnadien-20-one

The pyrazoline (6.5 grams) is decomposed thermally by heating in vacuo in an oil bath at 180–185° for 15 minutes. The product is then dissolved in hot methanol, cooled and filtered. The 3-acetoxy-16β-methyl-5,16-pregnadien-20-one thus obtained melts at 170–174° C. U.V. $\lambda_{max}$ 2510.

EXAMPLE 3

3-hydroxy-16-methyl-5-16-pregnadien-20-one

The 3-acetoxy-16α,17α-methyleneazo-5-pregnen-20-one (5.5 g.) is decomposed thermally by heating in vacuo at 180° for 10 minutes. The product, 3-acetoxy-16β-methyl-5,16-pregnadien-20-one is dissolved in methanol (350 ml.) and hydrolyzed by addition of a solution of potassium hydroxide (5.0 g. in water (50 ml.) to form 3-hydroxy-16-methyl-5,16-pregnadien-20-one. The mixture is refluxed one hour, cooled and diluted with water. The product is filtered, washed with water and dried. Crystallization from acetone gives product melting at 186–192° C. Recrystallization raises the melting point to 188–194° C. U.V. $\lambda_{max}$ 2510.

EXAMPLE 4

3-hydroxy-16,17-oxido-16-methyl-5-pregnen-20-one

To a solution of 3-hydroxy-16-methyl-5,16-pregnadien-20-one (2.5 g.) in methanol (150 ml.) is added 30% hydrogen peroxide (10 ml.) and 2.5 N sodium hydroxide (10 ml.). The solution is stirred at room temperature for 18 hours. The solution is diluted with a saturated sodium chloride solution (150 ml.) and the oxide product is filtered, washed with water, cold methanol and ether. The oxide melts at 184–194° C.

*Analysis.*—Calcd. for $C_{21}H_{30}O_3$ (percent): C, 76.73; H, 9.37. Found (percent): C, 76.50; H, 9.24.

EXAMPLE 5

3-acetoxy-16,17-oxido-16β-methyl-5-pregnen-20-one

A mixture of 3-hydroxy-16,17-oxido-16-methyl pregnenolone (5.0 g.), pyridine (20 ml.) and acetic anhydride (20 ml.) is stirred overnight at room temperature. The solution is then poured onto ice and filtered. The product is washed thoroughly with water and dried in vacuo. The 3-acetoxy-16,17-oxido-16β-methyl-5-pregnen-20-one (M.P. 179–181° C.) is recrystallized from methanol to yield product of melting point 181–183° C. $[\alpha]_D^{25} = -13°$ C=1.62% (CHCl₃).

EXAMPLE 6

5,6-dichloro-3-acetoxy-16,17-oxido-16β-methyl-allopregnan-20-one

Dry chlorine gas is slowly bubbled into a mixture of dry benzene (26.2 ml.) and pyridine (.15 ml.). Simultaneously a solution of 3-acetoxy-16,17-oxido-5-pregnen-20-one (4.3 g.) in dry benzene (26.2 ml.) and pyridine (.15 ml.) is added dropwise with stirring at a rate to maintain a slight excess of chlorine. The temperature is maintained at 20–25° during the addition period (approximately 40 minutes). The mixture is then poured into a 0.5% sodium thiosulfate solution to reduce excess chlorine. The benzene solution containing the product is then washed with water, 5% hydrochloric acid and finally with water. The benzene solution is dried and concentrated to dryness. The residue is crystallized from acetone to yield product melting at 181–184° C. $[\alpha]_D^{21}=22°$ C=1 (dioxane).

EXAMPLE 7

5,6-dichloro-3,7α-dihydroxy - 16 - methyl - 15(16) - allopregnen-20-one and 5,6-dichloro-3,17α-dihydroxy-16-methylene-allopregnan-20-one A solution of 5,6-dichloro-3-acetoxy-16,17-oxido-16β-methyl-allopregnan-20-one (2.0 g.) in dioxane (75 ml.) and 2 N perchloric acid (20 ml.) is stirred for 48 hours at room temperature. The mixture is diluted with an equal volume of water and the precipitate is filtered and washed thoroughly with water. The mixture of unsaturated products including 5,6-dichloro-3,17α-dihydroxy-16-methyl-15(16)-allopregnen - 20 - one and 5,6-dichloro-3,17α-dihydroxy-16-methylene-allopregnan-20-one is crystallized from methanol-petroleum ether to remove a small amount of an ultraviolet absorbing by-product. The melting point of the mixture after this treatment is 194–198° C. dec. The optical rotation of this mixture is —114° (CHCl$_3$).

The mixture of 3-hydroxy compounds is converted to the corresponding 3-acetoxy compounds on treatment with acetic anhydride and pyridine.

EXAMPLE 8

5,6-dichloro-3,17α-dihydroxy-16β-methyl-allopregnan-20-one

A mixture of 1 g. of the unsaturated 3-hydroxy compounds prepared as described in Example 7 is hydrogenated at 40 p.s.i. in purified dioxane (25 ml.) in the presence of a platinum oxide catalyst (0.12 g.). The catalyst is first prereduced in the dioxane. After the adsorption of the theoretical amount of hydrogen the hydrogenation is stopped and the catalyst removed by filtration. Water (100 ml.) is added to precipitate the product which is then recovered by filtration and dried. M.P. 198–202° C. Two recrystallizations from acetone raises the melting point to 207–209° C.

$$[\alpha]_D^{25}=-69°\ C=1\ (CHCl_3)$$

EXAMPLE 9

5,6-dichloro-3,17α-dihydroxy-21-acetoxy-16β-methyl-allopregnan-20-one

A solution of 5,6-dichloro-3,17α-dihydroxy-16β-methyl-allopregnan-20-one (621 mg.) in chloroform (15 ml.) containing a trace of methanol (.03 ml.) is heated to 45° C. A solution (4.67 ml.) of .352 M bromine in chloroform is then added dropwise over a period of 45 minutes at 40–45° C. After the bromine addition is completed, the solution is poured into ether (60 ml.) and is washed with saturated sodium bicarbonate solution, water and finally dried over magnesium sulfate. The drying agent is removed by filtration and the filtrate is concentrated to dryness in vacuo. The residual crude material is dissolved in a minimum amount of benzene and the benzene solution is diluted with petroleum ether to induce crystallization. The crystalline product is filtered, washed with petroleum ether and dried to give 21-bromo-5,6-dichloro-3,17α - dihydroxy - 16β - methyl-allopregnan-20-one.

The 21-bromo-5,6 - dichloro - 3,17α - dihydroxy - 16β-methyl-allopregnan-20-one (915 mg.) is mixed with anhydrous potassium acetate (882 mg.) potassium iodide (700 mg.) glacial acetic acid (.01 ml.), and acetone (18 ml.). This mixture is then heated at reflux, with stirring, for a period of about 18 hours. The mixture is then cooled, filtered and the insoluble material washed with acetone. The filtrate is concentrated to dryness in vacuo. The residue is triturated with water and the aqueous mixture is extracted with ethyl acetate. The ethyl acetate extract is washed with water to neutrality, dried, and the solvent is evaporated in vacuo to give an oil. The oil is crystallized from benzene-petroleum ether to give substantially pure 5,6-dichloro-3,17α-dihydroxy-21-acetoxy-16β-methyl-allopregnan-20-one.

EXAMPLE 10

5,6-dichloro-17α-hydroxy-21-acetoxy-16β-methyl-allopregnane-3,20-dione

To a solution of 5,6-dichloro-16β-methyl-allopregnan-3β,17α,21-triol-20-one 21-acetate (300 mg.) in 90% acetic acid (2.2 ml.) cooled in an ice bath, is added dropwise a solution of chrominum trioxide (67 mg.) in water (.06 ml.) and acetic acid (.75 ml.). To this cold mixture is then added concentrated sulfuric acid (.036 ml.) and the reaction mixture is held at 0–5° in an ice bath for one hour. The excess chromium trioxide is reduced by addition of methanol (.06 ml.). The reaction mixture is diluted with water and the product is collected by filtration and is washed thoroughly with water and dried. The 5,6-dichloro-17α-hydroxy - 21 - acetoxy - 16β-methyl-allopregnene-3,20-dione is sufficient purity to be used directly in the dechlorination reaction.

EXAMPLE 11

17α-hydroxy-21-acetoxy-16β-methyl-4-pregnene-3,20-dione

To the crude 5,6-dichloro - 17α - hydroxy-21-acetoxy-16β-methyl-allopregnan-20-one obtained as described in Example 10 is added an aqueous acetone solution of chromous chloride which is prepared in the usual manner by reduction of chromic chloride (1.67 g.) with amalgamated zinc. The solution is refluxed five minutes and the acetone is distilled in vacuo. The residue is treated with water, filtered and is washed thoroughly to remove the inorganic salts. After drying at room temperature in vacuo, the product is dissolved in acetone (12 ml.) and 1 N sulfuric acid in acetone (.27 ml.) is added. The solution is refluxed for about 9 minutes and then the sulfuric acid neutralized by the addition of sodium acetate. The acetone is distilled in vacuo and the residue is dissolved in ethyl acetate and is washed with water to neutrality. The ethyl acetate extract of product is dried, filtered and is concentrated to dryness. The residue is crystallized from acetone, filtered, washed with cold acetone and dried thoroughly to give substantially pure 17α-hydroxy-21-acetoxy-16β-methyl-4-pregene-3,20-dione.

EXAMPLE 12

Fifty milliliters of a nutrient medium are prepared having the following composition:

Cerelose—1 g.
Edamin—1 g.
Cornsteep liquor—0.24 ml.
Distilled water to make—50 ml.

This medium is adjusted to pH 6.5 with KOH, sterilized and inoculated with about 2.5 to 5 ml. of a culture of *Bacillus sphaericus* (ATCC–245) microorganisms, and the inoculated culture is then incubated at a temperature of 28° C., with agitation, for a 24-hour period. To the resulting culture is added a solution containing 10 mg. of 17α,21-dihydroxy-16β-methyl - 4 - pregnene-3,20-dione dissolved in 0.2 ml. of dimethylformamide. The culture containing the steroid compound is incubated, with agitation, for an additional period of about 24 hours at 28° C.

The fermentation broth is extracted with four 50 ml. portions of ethyl acetate, and the ethyl acetate extracts are combined and evaporaed in vacuo to a volume of about 5 ml. The concentrated solution is then streaked on paper chromatograms which are developed using dimethylformamide as the stationary phase and 50% benzene-50% chloroform as the mobile phase. After 8 hours development in a descending system, the upper bands for each chromatogram, corresponding to the Δ¹-dehydro derivative, are cut off, extracted with methanol, and the methanol extracted material is again subjected to steakpaper chromatography. The upper band is again cut off, thoroughly dried, extracted with methanol, and the methanol extract is evaporated to dryness in vacuo. The residual material is recrystallized from ethyl acetate-petroleum ether to give 17α,21-dihydroxy-16β-methyl-1,14-pregnadiene-3,20-dione.

We claim:
1. 3β - hydroxy-16α,17α-oxido-16β-methyl-5-pregnen-20-one.
2. 3β - acetoxy-16α,17α-oxido-16β-methyl-5-pregnen-20-one.
3. 5α,6β-dichloro - 3β,17α - dihydroxy - 16 - methyl-15(16)-allopregnan-20-one.
4. 5α,6β-dichloro - 3β,17α - dihydroxy - 16 - methylene-allopregnan-20-one.
5. A compound selected from the group consisting of 3β - hydroxy - 16α,17α - oxido - 16β - methyl-5-pregnen-20-one and lower aliphatic carboxylic acid esters thereof.
6. A compound selected from the class consisting of 5α,6β-dichloro - 3β,17α - dihydroxy - 16 - methyl-15(16)-allopregnen-20-one, 5α,6β-dichloro - 3β,17α - dihydroxy-16-methylene-allopregnan-20-one and 3-lower aliphatic carboxylic acid esters thereof.
7. The process which comprises contacting a lower aliphatic carboxylic ester of 5α,6β-dichloro-3-hydroxy1 16α,17α - oxido - 16β - methyl-allopregnan-20-one with aqueous perchloric acid to form a mixture of 5α,6β-dichloro - 3,17α - dihydroxy - 16 - methyl-15(16)-allopregnen-20-one and 5α,6β - dichloro - 3,17α - dihydroxy-16-methylene-allopregnan-20-one.
8. A compound of the formula

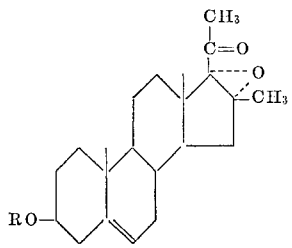

wherein R is selected from the group consisting of H and Lower alkanoyl.

References Cited
UNITED STATES PATENTS

| | | | |
|---|---|---|---|
| 2,588,391 | 3/1952 | Julian et al. | 260—397.4 |
| 2,697,109 | 12/1954 | Dodson | 260—397.3 |
| 2,705,233 | 3/1955 | Julian | 260—239.55 |
| 2,750,381 | 6/1956 | Hogg et al. | 260—239.55 |
| 2,752,339 | 6/1956 | Julian et al. | 260—239.55 |
| 2,789,989 | 4/1957 | Julian et al. | 260—397.47 |
| 2,805,230 | 9/1957 | Stork et al. | 260—397.4 |
| 2,811,522 | 10/1957 | Cutler | 260—239.55 |
| 2,822,381 | 2/1958 | Dodson et al. | 260—397.4X |
| 2,874,154 | 2/1959 | Stork et al. | 260—239.55 |
| 2,884,417 | 4/1959 | Cutler et al. | 260—239.55 |
| 2,897,219 | 7/1959 | Wettstein et al. | 260—397.47 |

OTHER REFERENCES

Szpilfogel et al.: Rec. Trav. Chem., vol. 75, 475–80 (1956).
Taub et al.: 80 J.A.C.S. 4435 (1958).
Oliveto et al.: 80 J.A.C.S. 4428 (1958).
Wettstein: Helv. Chem. Acta., vol. 27, 1805 (1944).

ELBERT L. ROBERTS, Primary Examiner

U.S. Cl. X.R.

260—239.5, 397.4 397.47